(12) United States Patent
Liu et al.

(10) Patent No.: US 12,145,869 B2
(45) Date of Patent: Nov. 19, 2024

(54) HOLLOW FIBER NANOFILTRATION MEMBRANE SYSTEM AND CONTROL METHOD THEREOF

(71) Applicant: Greentech Environment Co., Ltd., Beijing (CN)

(72) Inventors: Mu Liu, Beijing (CN); Yingqiang Su, Beijing (CN); Zehua Li, Beijing (CN); Mengyuan Duan, Beijing (CN); Kai Sun, Beijing (CN); Xikun Zhu, Beijing (CN); Liyan Zhang, Beijing (CN); Cong Xiao, Beijing (CN); Huiming Han, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 18/672,395

(22) Filed: May 23, 2024

(65) Prior Publication Data
US 2024/0308883 A1 Sep. 19, 2024

(30) Foreign Application Priority Data
Jun. 13, 2023 (CN) .......................... 202310694549.4

(51) Int. Cl.
*C02F 1/44* (2023.01)

(52) U.S. Cl.
CPC ........ *C02F 1/442* (2013.01); *C02F 2209/001* (2013.01); *C02F 2209/003* (2013.01); *C02F 2209/03* (2013.01); *C02F 2301/04* (2013.01); *C02F 2303/20* (2013.01)

(58) Field of Classification Search
None
See application file for complete search history.

(56) References Cited

U.S. PATENT DOCUMENTS

| 2008/0230476 A1 | 9/2008 | Gilron |
| 2017/0203979 A1 | 7/2017 | Tarquin et al. |

(Continued)

FOREIGN PATENT DOCUMENTS

| CN | 1490252 A | 4/2004 |
| CN | 105753105 A | 7/2016 |
| CN | 112960737 A | 6/2021 |

(Continued)

*Primary Examiner* — Richard C Gurtowski

(57) ABSTRACT

A hollow fiber nanofiltration membrane system and its control method are provided. The system includes a water feeding system, a return system, a hollow fiber nanofiltration membrane group, a water production system, a cleaning system, a dosing system and a program control system. Through the self-matching, self-adaptation and self-adjustment functions of the program control system, an intelligent and accurate operation control is formed according to water quality and operation condition. In the control method, the program control system presets an operation mode according to a preset working condition and an inlet water quality, automatically selects whether to add the scale inhibitor or perform concentrated water return at a beginning of filtration, automatically outputs a dosage of the scale inhibitor or the concentrated water return flow, and monitor a change of the inlet water quality, and the feedwater pressure or a transmembrane pressure in real time.

5 Claims, 2 Drawing Sheets

(56) References Cited

U.S. PATENT DOCUMENTS

2018/0155226 A1 6/2018 Relenyi et al.
2019/0047885 A1* 2/2019 Nelson ................... C02F 1/685

FOREIGN PATENT DOCUMENTS

| CN | 114733359 A | 7/2022 |
| CN | 115282781 A | 11/2022 |
| CN | 115364675 A | 11/2022 |
| KR | 20210071474 A | 6/2021 |
| WO | 2022242051 A1 | 11/2022 |

* cited by examiner

HOLLOW FIBER NANOFILTRATION MEMBRANE SYSTEM AND CONTROL METHOD THEREOF

CROSS-REFERENCE TO RELATED APPLICATIONS

This application claims the benefit of priority from Chinese Patent Application No. 202310694549.4, filed on Jun. 13, 2023. The content of the aforementioned application, including any intervening amendments thereto, is incorporated herein by reference in its entirety.

TECHNICAL FIELD

This application relates to water treatment technologies, and more particularly to a hollow fiber nanofiltration membrane system and a control method thereof.

BACKGROUND

Nanofiltration is a common membrane separation process in the water treatment, especially in the advanced treatment involving the organic matter degradation and hardness removal. However, in the current engineering applications, rolled nanofiltration is the predominant configuration type, which has many problems during the practical application. For example, the rolled nanofiltration membrane has poor anti-fouling ability, and thus has strict requirements for the influent quality. Specifically, the influent is required to meet the following conditions: silt density index (SDI)<5; turbidity <0.5 NTU; residual chlorine≤0.1 ppm; and aluminum, iron and manganese <0.05 ppm. In light of this, it is required to pre-treat the water sample by microfiltration or ultrafiltration, which increases the treatment cycle and difficulty, and results in high space occupation and investment. Moreover, the rolled nanofiltration membrane cannot be backwashed, and is not resistant to oxidation, and thus it cannot be washed with oxidizing agents, and also cannot be treated by chemically enhanced backwash (CEB), which limits the cleaning effects, resulting in high pressure and high pressure difference in the operation, frequent cleaning in place (CIP) and high water production cost. In addition, the rolled nanofiltration has a high removal rate of high valence ions, which will result in high total phosphorus level in concentrated water, thereby limiting the concentrated water discharge.

SUMMARY

In order to overcome the above problems, this application provides a hollow fiber nanofiltration membrane system and a control method thereof.

In a first aspect, the present disclosure provides a hollow fiber nanofiltration membrane system. The hollow fiber nanofiltration membrane system comprising a water feeding system, a return system, a hollow fiber nanofiltration membrane group, a water production system, a cleaning system, a dosing system, and a program control system;

wherein the water feeding system is connected with the hollow fiber nanofiltration membrane group through a first pipe, and is configured to provide a feedwater pressure required by operation of the hollow fiber nanofiltration membrane group;

the return system is connected with the first pipe, and is configured to provide a concentrated water return flow required by the operation of the hollow fiber nanofiltration membrane group;

the hollow fiber nanofiltration membrane group is configured to perform solid-liquid separation for a raw water sample to trap foulants and produce clear water;

the water production system is connected with the hollow fiber nanofiltration membrane group, and is configured to provide a water storage tank or a water box to store produced water from the hollow fiber nanofiltration membrane group and provide a discharge destination for the produced water from the hollow fiber nanofiltration membrane group;

the cleaning system is connected with the water production system and the hollow fiber nanofiltration membrane group, and is configured to provide physical cleaning and chemical cleaning for the hollow fiber nanofiltration membrane group;

the dosing system comprising a first dosing device and a second dosing device; the first dosing device is connected with the first pipe, and is configured to provide selective and simultaneous dosing of a scale inhibitor at an inlet end of the hollow fiber nanofiltration membrane group; the second dosing device is connected with the cleaning system, and is configured to feed an acid, an alkali or a disinfectant to the cleaning system;

the program control system is connected with the water feeding system, the return system, the water production system, the cleaning system and the dosing system, and is configured to control operation of the water feeding system, the return system, the water production system, the cleaning system and the dosing system; and the program control system is also configured for simultaneous monitoring, observation and feedback record of corresponding operation data or state and fault or alarm, and real-time analysis and calculation to adjust a working condition parameter.

In a second aspect, the present disclosure provides a control method of the above hollow fiber nanofiltration membrane system, comprising:

presetting, by the program control system, an operation mode according to a preset working condition and an inlet water quality obtained in real time, and automatically selecting, by the program control system, whether to add the scale inhibitor or perform concentrated water return at a beginning of filtration; and automatically outputting, by the program control system, a dosage of the scale inhibitor or the concentrated water return flow to perform dosing of the scale inhibitor or the concentrated water return in response to a requirement to add the scale inhibitor or perform the concentrated water return.

In an embodiment, the preset working condition comprises a membrane flux and a recovery rate; and the inlet water quality comprises water temperature, electrical conductivity and turbidity;

the membrane flux is represented as J; the recovery rate is represented as y; the water temperature is represented as t; the electrical conductivity is represented as E; and the turbidity is represented as $T_U$;

wherein $a=0.5E/(1-y)/1000$;

$b=(T_U/3)\times(J/25)\times(y/80\%)$; and $c=t/15$;

when $a<1$ and $b<1$, neither the dosing of the scale inhibitor nor the concentrated water return is performed;

when a≥1 and b<1, only the scale inhibitor is added, and the concentrated water return is not performed; and at this time, the dosage of the scale inhibitor dosage is represented as D, when c≥1, D=0.3a−0.1; and when 0<c<1, D=0.3a;

when a<1 and b≥1, the scale inhibitor is not added, and only the concentrated water return is performed; and at this time, a ratio of the concentrated water return is represented as F, when c≥1, F=2.1b−0.5; and when 0<c<1, F=2.1b.

In an embodiment, the control method further comprises: monitoring, by the program control system, a change of the inlet water quality, and the feedwater pressure or a transmembrane pressure in real time during the operation of the hollow fiber nanofiltration membrane group; and adjusting, by the program control system, the dosing of the scale inhibitor or the concentrated water return flow according to a calculation result in response to a case that the feedwater pressure or the transmembrane pressure exceeds a set limit value.

In an embodiment, the number of filtration-flushing operation in a single chemically enhanced backwash (CEB) cycle is set as M; a limit of the feedwater pressure and a limit of the transmembrane pressure at an end of an M-th filtration before an M-th flushing are set to 6 bar and 5.5 bar, respectively, and the feedwater pressure and the transmembrane pressure at a beginning of a first filtration are represented as $P1_{1beginning}$, and $P2_{1beginning}$; such that a limit of the feedwater pressure and a limit of the transmembrane pressure at an end of an N-th filtration before an N-th flushing are $P1_{Nend}=P1_{1beginning}+(6-P1_{1beginning})\times N/M$, and $P2_{Nend}=P2_{1beginning}+(6-P2_{1beginning})\times N/M$, wherein 1≤ N≤ M; and during the N-th filtration, an actual feedwater pressure and an actual transmembrane pressure of the hollow fiber nanofiltration membrane group are respectively represented as $P1_N$ and $P2_N$, and the feedwater pressure and the transmembrane pressure at a beginning of the N-th filtration are respectively represented as $P1_{Nbeginning}$ and $P2_{Nbeginning}$, such that an increase of the feedwater pressure is expressed as $\Delta P1=P1_N-P1_{Nbeginning}$, and an increase of the transmembrane pressure is expressed as $\Delta P2=P2_N-P2_{Nbeginning}$; and if $P1_N>P1_{Nend}$ or $P2_N>P2_{Nend}$, the dosing of scale inhibitor or the concentrated water return is correspondingly adjusted.

In an embodiment, the dosing of the scale inhibitor or the concentrated water return is adjusted as follows:

when only $P1_N>P1_{Nend}$ occurs, the ratio of the concentrated water return is increased by 0.5;

when only $P2_N>P2_{Nend}$ occurs, the dosage of the scale inhibitor dosage is increased by 0.2 ppm; and when $P1_N>P1_{Nend}$ and $P2_N>P2_{Nend}$ both occur, if $\Delta P1\geq\Delta P2$, the ratio of the concentrated water return is increased by 0.5; and if $\Delta P1<\Delta P2$, the dosage of the scale inhibitor is increased by 0.2 ppm.

In an embodiment, a flushing mode at an end of each filtration process is determined by the program control system according to an operation pressure change or a transmembrane pressure change during the filtration process, wherein the flushing mode is forward flushing+air flushing or backwashing, or dosing-forward flushing+air flushing, which ensures maximum flushing effect.

In an embodiment, during the N-th filtration, an increase rate of the feedwater pressure is expressed as $\Delta 1=\Delta P1/P1_{Nbeginning}$, and an increase rate of the transmembrane pressure is expressed as $\Delta 2=\Delta P2/P2_{Nbeginning}$;

when the N-th filtration is ended, and an N-th flushing is about to be performed, if $\Delta P1\geq\Delta P2$, a mode of forward flushing+air flushing is executed;

when the N-th filtration is ended, and the N-th flushing is about to be performed, if $\Delta P1<\Delta P2$ and $\Delta 1\geq\Delta 2$, a mode of backwashing is executed; and when the N-th filtration is ended, and the N-th flushing is about to be performed, if $\Delta P1<\Delta P2$ and $\Delta 1<\Delta 2$, a mode of dosing-forward flushing+air flushing is executed.

In an embodiment, when a chemically enhanced backwash operation is required after multiple filtration-flushing operations have been carried out, a dosing concentration and soaking time of the chemically enhanced backwash operation are calculated by the program control system based on a feedwater pressure change and a transmembrane pressure change in an operation cycle before the chemically enhanced backwash operation.

In an embodiment, the feedwater pressure change and the transmembrane pressure change in the operation cycle before the chemically enhanced are respectively expressed as $\Delta P3=P1_M-P1_{1beginning}$, and $\Delta P4=P2_M-P2_{1beginning}$;

when $\Delta P3\leq 0.5$ bar and $\Delta P3/\Delta P4\geq 1$, the dosing concentration of the chemically enhanced backwash operation is 2000 ppm of citric acid, 50 ppm of sodium hypochlorite and 100 ppm of sodium hydroxide, and the soaking time of the chemically enhanced backwash operation is 10 min;

when $\Delta P3\leq 0.5$ bar and $\Delta P3/\Delta P4<1$, the dosing concentration of the chemically enhanced backwash operation is 2500 ppm of citric acid, 50 ppm of sodium hypochlorite and 100 ppm of sodium hydroxide, and the soaking time of the chemically enhanced backwash operation is 10 min;

when 0.5 bar<$\Delta P3\leq 1.0$ bar and $\Delta P3/\Delta P4\geq 1$, the dosing concentration of the chemically enhanced backwash operation is 2500 ppm of citric acid, 100 ppm of sodium hypochlorite and 150 ppm of sodium hydroxide, and the soaking time of the chemically enhanced backwash operation is 15 min;

when 0.5 bar<$\Delta P3\leq 1.0$ bar and $\Delta P3/\Delta P4\leq 1$, the dosing concentration of the chemically enhanced backwash operation is 3000 ppm of citric acid, 100 ppm of sodium hypochlorite and 150 ppm of sodium hydroxide, and the soaking time of the chemically enhanced backwash operation is 15 min;

when $\Delta P3>1.0$ bar and $\Delta P3/\Delta P4\geq 1$, the dosing concentration of the chemically enhanced backwash operation is 3500 ppm of citric acid, 200 ppm of sodium hypochlorite and 250 ppm of sodium hydroxide, and the soaking time of the chemically enhanced backwash operation is 20 min; and when $\Delta P3>1.0$ bar and $\Delta P3/\Delta P4<1$, the dosing concentration of the chemically enhanced backwash operation is 4000 ppm of citric acid, 200 ppm of sodium hypochlorite and 250 ppm of sodium hydroxide, and the soaking time of the chemically enhanced backwash operation is 20 min.

Compared to the prior art, the present disclosure has the following beneficial effects.

In the hollow fiber nanofiltration membrane system of the present disclosure, through the self-matching, self-adaptation and self-adjustment functions of the program control system, an intelligent and accurate control of the operation of the whole system is achieved according to the water quality and the operation conditions, which greatly improves the operation adjustment ability of the membrane system, alleviates the membrane fouling and blockage, ensures stable operation of the hollow fiber nanofiltration membrane system, and reduces difficulty of operation management of the hollow fiber nanofiltration membrane system. Compared to the existing operation control methods, the present disclosure can reduce the operating pressure from 4.5-5.5 bar to 4.0-4.5 bar, and reduce the system power consumption by about 11-18%.

BRIEF DESCRIPTION OF THE DRAWINGS

The accompanying drawings herein, in which some embodiments of the present disclosure are displayed, are incorporated into and form a part of the specification, and used to explain principles of the present disclosure together with the specification.

To facilitate the understanding of technical solutions of embodiments of the present disclosure or the prior art, accompanying drawings needed in the description of embodiments or the prior art will be briefly introduced below. It is obvious that presented in the accompanying drawings are only some embodiments of the present disclosure, and those skilled in the art can obtain other drawings according to these accompanying drawings without any creative effort.

DETAILED DESCRIPTION OF EMBODIMENTS

Figure 1:
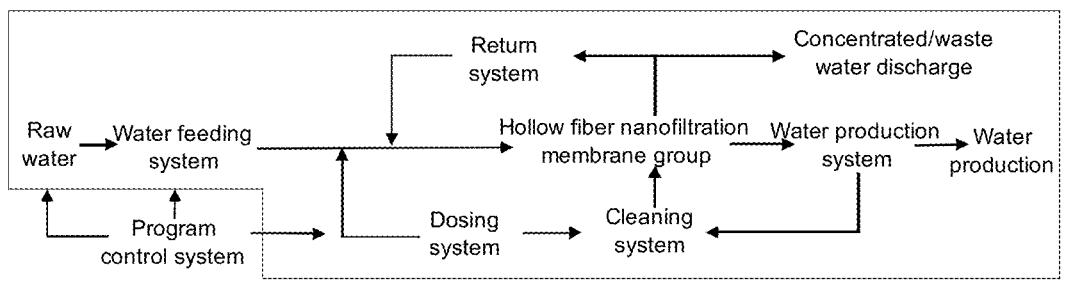
FIG. 1 is a schematic diagram of a structure of a hollow fiber nanofiltration membrane system according to an embodiment of the present disclosure.

To facilitate the understanding of the objectives, features and advantages of the present disclosure, the present disclosure will be further described below with reference to the embodiments. It should be noted that the embodiments of the present disclosure and the features therein may be combined with each other in the absence of contradiction.

Many specific details are described below to facilitate the full understanding of the present disclosure, but the present disclosure may be implemented in other ways different from the embodiment herein. It is obvious that the embodiments described herein are only part of embodiments of the present disclosure rather than all embodiments.

Hollow fiber nanofiltration is resistant to fouling without a need of strict inlet water quality conditions. Maximum inlet turbidity of the hollow fiber nanofiltration can be 100-300 NTU, which has a small influence on aluminum, iron and manganese. Therefore, there is no need for a good pretreatment process, and it can directly dock with a coagulating sedimentation technology, which reduces land occupation and investment. Besides, the hollow fiber nanofiltration can be performed by backwashing and chemically cleaning with oxidizing agents, which extends cleaning ways. It can also be performed by chemically enhanced backwash (CEB) to improve cleaning effect, which decreases or even dispenses with cleaning in place (CIP), decreases an operation pressure and a pressure difference, and reduces water production cost. In addition, a removal rate of high valence ions of the hollow fiber nanofiltration can be adjusted, which decreases a total phosphorus concentration in concentrated water and eliminates difficulty of concentrated water discharge.

The hollow fiber nanofiltration is superior to the conventional rolled nanofiltration in terms of anti-fouling performance, which can effectively alleviate the membrane fouling and blockage. However, considering that the inlet water quality of the short process pretreatment is inferior to that of the conventional rolled nanofiltration, the membrane fouling is still inevitable. The current hollow fiber nanofiltration operation method, combined with characteristics of conventional ultrafiltration and nanofiltration, performs cycle operation with concentrated water return+cross-flow filtration→flushing→CEB, which can delay membrane fouling, but there are still some problems. The concentrated water return can increase a flow rate inside a membrane silk and delay adhesion of foulant to a membrane element. The cleaning includes forward flushing, forward flushing+air flushing, backwashing, backwashing+air flushing, forward flushing+backwashing and so on, and corresponding cleaning is performed facing with different forms of membrane fouling, such as colloid particle fouling, and metal ion fouling. The CEB adopts alkaline cleaning or acid cleaning to enhance cleaning effect. In an actual engineering application operation, working condition parameters of the system operation is set fixedly and simply. (1) It can ensure a sufficient flow rate of water, and a larger concentration water return flow rate will lead to large power consumption. (2) The cleaning method of the hollow fiber nanofiltration is single, and the hollow fiber nanofiltration can only perform cleaning and CEB according to one of set cleaning methods. In the face of a change of water quality of the incoming water and membrane fouling and blockage, improper cleaning method will cause ineffective cleaning effect. Insufficient dosing concentration of CEB or short soaking time will affect the cleaning effect, and high CEB dosing concentration or long soaking time will lead to the waste of agents and time. In this way, in the overall operation, the water production decays faster, the feedwater pressure and the pressure difference are higher, and the power consumption is higher, which cannot exert advantages of the hollow fiber nanofiltration, seriously restricts good and stable operation of the hollow fiber system, increases difficulty of operation management and limits its actual engineering application.

The present disclosure provides hollow fiber nanofiltration membrane system and a control method thereof, with the self-matching, self-adaptation and self-adjustment. In the face of the change of the water quality of the incoming water and the membrane fouling and blockage, according to a real-time water quality change and a trend of membrane fouling, a program control system can perform corresponding analysis in real time, automatically adjust a working condition parameter and select an appropriate cleaning method to improve cleaning effect at the same time, delay the trend of membrane fouling and blockage and improve operation states of the hollow fiber nanofiltration hollow fiber nanofiltration membrane system, so as to ensure the good and stable operation of the membrane system.

In the operation of the membrane system, a whole operation process includes the filtration—the flushing—the CEB.

Figure 2:
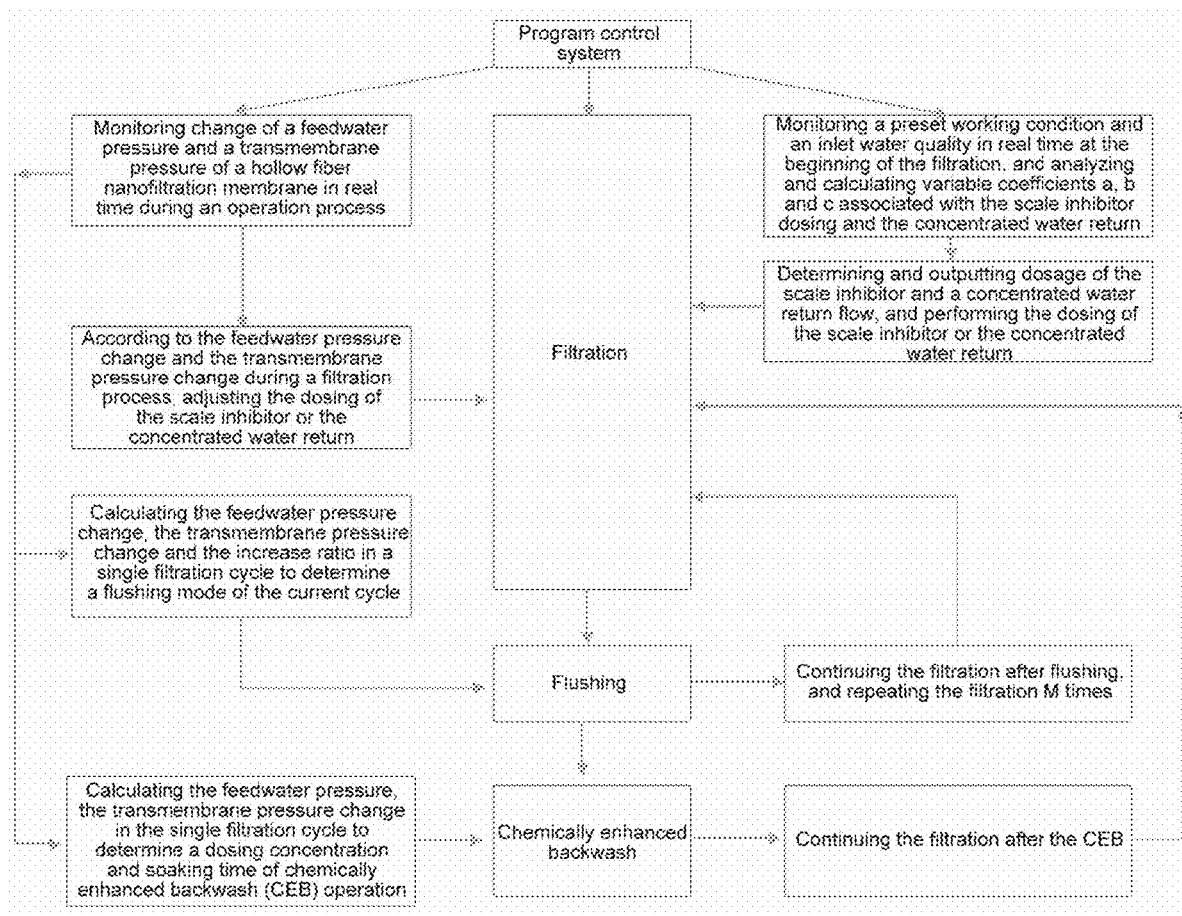
FIG. 2 is a control logic diagram of the hollow fiber nanofiltration membrane system according to an embodiment of the present disclosure.

Referring to FIGS. 1-2, the present disclosure provides a hollow fiber nanofiltration membrane system including a water feeding system, a return system, a hollow fiber nanofiltration membrane group, a water production system, a cleaning system, a dosing system and a program control system. The water feeding system is connected with the hollow fiber nanofiltration membrane group through a first pipe, and is configured to provide a feedwater pressure required by operation of the hollow fiber nanofiltration membrane group. The return system is connected with the first pipe, and is configured to provide a concentrated water return flow required for the filtration of the hollow fiber nanofiltration membrane group, so as to ensure a flow rate at a concentrated water end and avoid or delay a fouling phenomenon caused by concentration polarization of the membrane. The hollow fiber nanofiltration membrane group is configured to perform solid-liquid separation for a raw water sample to trap foulants and produce clear water. The water production system is connected with the hollow fiber nanofiltration membrane group, and is configured to provide a water storage tank or a water box to store produced water from the hollow fiber nanofiltration membrane group and provide a discharge destination for the produced water from the hollow fiber nanofiltration membrane group.

The cleaning system is connected with the water production system and the hollow fiber nanofiltration membrane group, and is configured to provide physical cleaning and chemical cleaning for the hollow fiber nanofiltration membrane group, so as to remove the foulants and blockage and foulants attached to the membrane element to restore its initial performance of filtration.

The dosing system includes a first dosing device and a second dosing device. The first dosing device is connected with the first pipe, and is configured to provide selective and simultaneous dosage of a scale inhibitor at an inlet end of the hollow fiber nanofiltration membrane group. The second dosing device is connected with the cleaning system, and is configured to feed an acid, an alkali or disinfectant to the cleaning system.

The program control system is connected with the water feeding system, the return system, the water production system, the cleaning system and the dosing system, and is configured to control operation of the water feeding system, the return system, the water production system, the cleaning system and the dosing system. And the program control system is also configured for simultaneous monitoring, observation and feedback record of operation data or states and fault or alarm, and real-time analysis and calculation to adjust a working condition parameter.

The operation data includes an inlet water quality, a produced water quality, a concentrated water quality, a flow rate, a pressure, a transmembrane pressure and a desalination rate. The inlet water quality includes pH, electrical conductivity and water temperature. The produced water quality includes the electrical conductivity. The concentrated water quality includes the electrical conductivity. The flow rate includes water inflow, water production, concentrated water and the concentrated water return. And the pressure includes the feedwater pressure, water production pressure and concentrated water pressure.

The operation states include whether the membrane is blocked or not, which mainly depends on the pressure, the transmembrane pressure and the desalination rate.

The working condition parameter includes a dosage of the scale inhibitor, a ratio of the concentrated water return, cleaning method selection and agent concentration and soaking time of a chemically enhanced backwash operation.

In an embodiment, the return system and a concentrated/waste water discharge system are connected with the hollow fiber nanofiltration membrane group through a second pipe. In an embodiment, an outlet of the second pipe is divided into a first branch and a second branch. The first branch is connected with the return system, and the second branch is connected with the concentrated/waste water discharge system. The return system is configured to return part of a flow of total concentrated water from the hollow fiber nanofiltration membrane group to the water feeding system through the second pipe, and the part of the flow of the total concentrated water combines the water feeding system followed by entering the hollow fiber nanofiltration membrane group.

In some embodiments, the program control system includes a water quality on-line monitoring module, an operation process state monitoring module, a dosage monitoring module and a control module. The control module is configured to receive feedback information from the water quality on-line monitoring module, the operation process state monitoring module and the dosage monitoring module. The control module is configured to control an operation of the water feeding system, the return system, the water production system, the cleaning system and the dosing system according to the feedback information. The control module includes a controller. The water quality on-line monitoring module is configured to monitor the electrical conductivity, temperature, a pH value and a desalinization rate. The operation process state monitoring module is configured to monitor the pressure, the transmembrane pressure and the desalinization rate. The dosage monitoring module is configured to monitor a dosage of a reducing agent, the scale inhibitor, the acid, the alkali or the disinfectant.

In the operation of the membrane system, the whole operation process is filtration-flushing-CEB.

First, an operation mode is preset by the program control system according to a preset working condition and an inlet water quality obtained in real time, and whether to add the scale inhibitor or perform concentrated water return at a beginning of filtration is automatically selected by the program control system. The addition of the scale inhibitor and the concentrated water return cannot be conducted at the same time. And a dosage of the scale inhibitor or the concentrated water return flow is automatically output by the program control system to perform dosing of the scale inhibitor or the concentrated water return in response to a requirement.

Second, a change of the inlet water quality and the feedwater pressure or a transmembrane pressure are monitored in real time by the program control system during the operation of the hollow fiber nanofiltration membrane group. And the dosing of the scale inhibitor or the concentrated water return flow is adjusted by the program control system according to a calculation result in response to a case that the feedwater pressure or the transmembrane pressure exceeds a set limit value.

Third, when the filtration is ended, and the flushing is about to be performed, a flushing mode at an end of each filtration process is determined by the program control system according to an operation pressure change or a transmembrane pressure change during the filtration process, where the flushing mode is forward flushing+air flushing, backwashing, or dosing-forward flushing+air flushing, which ensure maximum flushing effect.

Last, when a chemically enhanced backwash operation is required after multiple filtration-flushing operations have been carried out, a dosing concentration and soaking time of the chemically enhanced backwash operation are calculated by the program control system based on a feedwater pressure change and a transmembrane pressure change in an operation cycle before the chemically enhanced backwash operation, so as to ensure cleaning effect of the chemically enhanced backwash operation and reduces unnecessary agents and waste of time.

The whole operation process is completed after the chemically enhanced backwash operation is ended. And a step sequence and timing of the program control system are returned to zero. And the above steps are repeated and continue to operate a next operation process.

In the above steps, the preset working condition includes a membrane flux of 20 lmh-30 lmh, a recovery rate of 80%-90%. The dosage of the scale inhibitor is 0-1.5 ppm, the ratio of the concentrated water return, that is, a ratio of the concentrated water return flow, is 1-5, filtration time is 30-90 min, the operation pressure is 3-6 bar, the transmembrane pressure is 2.5-5.5 bar, the dosing concentration of the chemically enhanced backwash operation is 2000-4000 ppm of citric acid, 50-200 ppm of sodium hypochlorite and 100-250 ppm of sodium hydroxide, and the soaking time of the chemically enhanced backwash operation is 10-20 min.

In an embodiment, the membrane flux is 20 lmh-25 lmh, and the recovery rate is 85%-90%.

In an embodiment, the dosage of the scale inhibitor is 0.5 ppm-1.0 ppm, and the ratio of the concentrated water return is 2-3.

In an embodiment, the filtration time is 40-60 min, the operation pressure is 3-5 bar, and the transmembrane pressure is 2.5-4.5 bar.

In an embodiment, the dosing concentration of the chemically enhanced backwash operation is 2000-2500 ppm of citric acid, 50-100 ppm of sodium hypochlorite and 100-150 ppm of sodium hydroxide, and the soaking time of the chemically enhanced backwash operation is 10-15 min.

The program control system, through the self-matching, self-adaptation and self-adjustment functions, forms an intelligent and accurate control method of the operation of the whole system is achieved according to the water quality and the operation working condition, which greatly improves the operation adjustment ability of the membrane system, alleviates the membrane fouling and blockage, ensures stable operation of the hollow fiber nanofiltration membrane system, and reduces difficulty of operation management of the hollow fiber nanofiltration membrane system. Compared to the existing operation control method, the present disclosure can reduce the operation pressure from 4.5-5.5 bar to 4.0-4.5 bar, and reduce the system power consumption by about 11-18%.

A control method of the hollow fiber nanofiltration membrane system provided in the present disclosure includes the following steps.

The operation mode is preset by the program control system according to the preset working condition and the inlet water quality obtained in real time, and whether to add the scale inhibitor or perform concentrated water return at the beginning of filtration is automatically selected by the program control system. The dosing of the scale inhibitor and the concentrated water return cannot be conducted at the same time.

The dosage of the scale inhibitor or the concentrated water return flow is automatically output by the program control system to perform dosing of the scale inhibitor or the concentrated water return in response to the requirement.

In some embodiments, the preset working condition includes the membrane flux, and the recovery rate. And the inlet water quality includes the water temperature, the electrical conductivity and the turbidity.

The membrane flux has a baseline value of 25 lmh with an upper limit of 30 lmh and a lower limit of 20 lmh.

The recovery rate has a baseline value of 85% with an upper limit of 90% and a lower limit of 80%.

The water temperature has a baseline value of 15° C. with an upper limit of 35° C. and a lower limit of 1° C.

The electrical conductivity has a baseline value of 500 μs/cm with an upper limit of 1000 μs/cm and a lower limit of 300 μs/cm.

The turbidity has a baseline value of 3.0 NTU with an upper limit of 10 NTU and a lower limit of 0 NTU.

The membrane flux is represented as J, the recovery rate is represented as y, the water temperature is represented as t, the electrical conductivity is represented as E, and the turbidity is represented as Ty. And whether to add the scale inhibitor or perform the concentrated water return, as well as the dosage of the scale inhibitor and concentrated water return flow rate jointly determined by three variable coefficients a, b and c;

$a = 0.5E/(1-y)/1000;$ $b = (T_U/3) \times (J/25) \times (y/80\%);$ and $c = t/15.$ When $a<1$ and $b<1$, neither the dosing of the scale inhibitor, nor the concentrated water return is performed.

When $a \geq 1$ and $b<1$, only the scale inhibitor is added, and the concentrated water return is not performed. And at this time, the dosage of the scale inhibitor is represented as D. When $c \geq 1$, $D=0.3a-0.1$, and when $0<c<1$, $D=0.3a$.

When $a<1$ and $b \geq 1$, the scale inhibitor is not added, and only the concentrated water return is performed. At this time, the ratio of the concentrated water return is represented as F. When $c \geq 1$, $F=2.1b-0.5$, and when $0<c<1$, $F=2.1b$.

In some embodiments, a change of the inlet water quality and the feedwater pressure or a transmembrane pressure are monitored in real time by the program control system during the operation of the hollow fiber nanofiltration membrane group. And the dosing of the scale inhibitor or the concentrated water return flow is adjusted by the program control system according to a calculation result in response to a case that the feedwater pressure or the transmembrane pressure exceeds a set limit value.

In some embodiments, the number of filtration-flushing operations in a single CEB cycle is set as M, a limit of the feedwater pressure and a limit of the transmembrane pressure at an end of an M-th filtration before an M-th flushing are set to 6 bar and 5.5 bar, respectively, and the feedwater pressure and the transmembrane pressure at a beginning of a first filtration are respectively represented as $P1_{1beginning}$, and the pressure difference is represented as $P2_{1beginning}$, such that a limit of the feedwater pressure and a limit of the transmembrane pressure at an end of an N-th filtration before an N-th flushing are $P1_{Nend}=P1_{1beginning}+(6-P1_{1beginning}) \times N/M$, and $P2_{Nend}=P2_{1beginning}+(6-P2_{1beginning}) \times N/M$, where $1 \leq N \leq M$.

During the N-th filtration, an actual feedwater pressure and an actual transmembrane pressure of the hollow fiber nanofiltration membrane group are respectively represented as $P1_N$ and $P2_N$. The feedwater pressure and the transmembrane pressure at a beginning of the N-th filtration are respectively expressed as $P1_{Nbeginning}$ and $P2_{Nbeginning}$, such that an increase of the feedwater pressure is expressed as $\Delta P1=P1_N-P1_{Nbeginning}$, and an increase of the transmembrane pressure is expressed as $\Delta P2=P2_N-P2_{Nbeginning}$. And if $P1_N > P1_{Nend}$ or $P2_N > P2_{Nend}$, the dosing of the scale inhibitor or the concentrated water return is adjusted.

In some embodiments, a method for adjusting the scale inhibitor dosing or the concentrated water return includes the following situations.

When only $P1_N > P1_{Nend}$ occurs, the ratio of the concentrated water return is increased by 0.5.

When only $P2_N > P2_{Nend}$ occurs, the dosage of the scale inhibitor is increased by 0.2 ppm.

When $P1_N > P1_{Nend}$ and $P2_N > P2_{Nend}$ both occurs, if $\Delta P1 \geq \Delta P2$, the ratio of the concentrated water return is increased by 0.5. And if $\Delta P1 < \Delta P2$, the dosage of the scale inhibitor is increased by 0.2 ppm.

In some embodiments, when the filtration is ended, and the flushing is about to be performed, a flushing mode at an end of each filtration process is determined by the program control system according to an operation pressure change or a transmembrane pressure change during the filtration process, where the flushing mode is forward flushing+air flushing, backwashing, or dosing-forward flushing+air flushing, which ensure maximum flushing effect.

In some embodiments, an increase ratio of the feedwater pressure is expressed as $\Delta 1 = \Delta P1/P1_{Nbeginning}$, and an increase rate of the transmembrane pressure is expressed as $42 = \Delta P2/P2_{Nbeginning}$.

When the N-th filtration is ended, and an N-th flushing is about to be performed, if $\Delta P1 > \Delta P2$, a mode of forward flushing+air flushing is executed.

When the N-th filtration is ended, and an N-th flushing is about to be performed, if $\Delta P1 < \Delta P2$ and $\Delta 1 < \Delta 2$, a mode of backwashing is executed.

When the N-th filtration is ended, and an N-th flushing is about to be performed, if $\Delta P1 < \Delta P2$ and $\Delta 1 < \Delta 2$, a mode of dosing-forward flushing+air flushing is executed.

In some embodiments, when a chemically enhanced backwash operation is required after multiple filtration-flushing operations have been carried out, calculating, by the program control system, a dosing concentration and soaking time of the chemically enhanced backwash operation based on a feedwater pressure change and a transmembrane pressure change in an operation cycle before the chemically enhanced backwash operation, which ensures cleaning effect of the chemically enhanced backwash operation and reduces the addition of unnecessary agents and time consumption.

In some embodiments, the feedwater pressure change and the transmembrane pressure change in the operation cycle before the chemically enhanced backwash operation are respectively expressed as $\Delta P3 = P1_M - P1_{1beginning}$, and $\Delta P4 = P2_M - P2_{1beginning}$.

When $\Delta P3 \leq 0.5$ bar and $\Delta P3/\Delta P4 \geq 1$, the dosing concentration of the chemically enhanced backwash operation is 2000 ppm of citric acid, 50 ppm of sodium hypochlorite and 100 ppm of sodium hydroxide, and the soaking time of the chemically enhanced backwash operation is 10 min.

When $\Delta P3 \leq 0.5$ bar and $\Delta P3/\Delta P4 < 1$, the dosing concentration of the chemically enhanced backwash operation is 2500 ppm of citric acid, 50 ppm of sodium hypochlorite and 100 ppm of sodium hydroxide, and the soaking time of the chemically enhanced backwash operation is 10 min.

When 0.5 bar<$\Delta P3 \leq 1.0$ bar and $\Delta P3/\Delta P4 \geq 1$, the dosing concentration of the chemically enhanced backwash operation is 2500 ppm of citric acid, 100 ppm of sodium hypochlorite and 150 ppm of sodium hydroxide, and the soaking time of the chemically enhanced backwash operation is 15 min.

When 0.5 bar<$\Delta P3 \leq 1.0$ bar and $\Delta P3/\Delta P4 < 1$, the dosing concentration of the chemically enhanced backwash operation is 3000 ppm of citric acid, 100 ppm of sodium hypochlorite and 150 ppm of sodium hydroxide, and the soaking time of the chemically enhanced backwash operation is 15 min.

When $\Delta P3 > 1.0$ bar and $\Delta P3/\Delta P4 \geq 1$, the dosing concentration of the chemically enhanced backwash operation is 3500 ppm of citric acid, 200 ppm of sodium hypochlorite and 250 ppm of sodium hydroxide, and the soaking time of the chemically enhanced backwash operation is 20 min.

When $\Delta P3 > 1.0$ bar and $\Delta P3/\Delta P4 < 1$, the dosing concentration of the chemically enhanced backwash operation is 4000 ppm of citric acid, 200 ppm of sodium hypochlorite and 250 ppm of sodium hydroxide, and the soaking time of the chemically enhanced backwash operation is 20 min.

Through above intelligent control, compared to existing operation control methods, the present disclosure can reduce the operating pressure by 0.5-1.0 bar, and reduce the system power consumption by about 11-18%.

The present disclosure is described below in combination with specific embodiments.

For example, in a project site, the incoming water of the hollow fiber nanofiltration membrane group was effluent of coagulating sedimentation from surface water source to water plant. And the preset working condition was 25 lmh of the membrane flux and 85% of the recovery rate. In an initial operation, the water temperature was 10-11° C., the electrical conductivity was 500-550 μs/cm and the turbidity was 1-2.5 NTU.

According to the preset working condition and an initial inlet water quality, a was 1.67-1.83, b was 0.35-0.89 and c was 0.67-0.73, which conforms to a≥1 and b<1, only the scale inhibitor was added, and the concentrated water return was not performed. At this time, 0<c<1, the dosage of the scale inhibitor was represented as D=0.3a, that was, 0.50-0.55 ppm.

A single filtration time was set as 50 min, the number of filtration-flushing operations was set as 36. A limit of the feedwater pressure and a limit of the transmembrane pressure at an end of the 36-th filtration before the 36-th flushing were 6 bar and 5.5 bar, respectively. The feedwater pressure $P1_{1beginning}$ was 3.85 bar, and the transmembrane pressure $P2_{1beginning}$ was 3.80 bar, and such that a limit of the feedwater pressure and a limit of the transmembrane pressure at an end of an N-th filtration before an N-th flushing are $P1_{Nend} = 3.85 + 2.15_N/36$ and $P2_{Nend} = 3.8 + 1.7_N/36$. During a first filtration, the feedwater pressure was 3.85-4.00 bar, and the transmembrane pressure was 3.80-3.90 bar. When the feedwater pressure $P1_{Nbeginning} > P1_{Nend}$ (namely, 3.91 bar), the transmembrane pressure was 3.87 bar, the increase of the feedwater pressure $\Delta P1$ was 0.06 bar, and the increase of the transmembrane pressure $\Delta P2$ was 0.07 bar. $\Delta P1 < \Delta P2$, such that the dosage of the scale inhibitor was 0.2 ppm. When the first filtration is ended and the first flushing was about to be performed, the increase of the feedwater pressure $\Delta P1$ was 0.15 bar, and the increase of the transmembrane pressure $\Delta P2$ was 0.10 bar. $\Delta P1 > \Delta P2$, such that a mode of the forward flushing+the air flushing is selected.

After that, the hollow fiber nanofiltration membrane system continues to operate and performs the dosing of the scale inhibitor or the concentrated water return. Before the 36th chemically enhanced backwash operation, the feedwater pressure was 4.46 bar, the transmembrane pressure was 4.35 bar, $\Delta P3$ was 0.61 bar, and $\Delta P4$ was 0.55 bar. At this time, 0.5 bar<$\Delta P3 \leq 1.0$ bar and $\Delta P3/\Delta P4 \geq 1$, such that the dosing concentration of the chemically enhanced backwash operation was 2500 ppm of citric acid, 100 ppm of sodium hypochlorite and 150 ppm of sodium hydroxide, and the soaking time of the CEB was 15 min.

After the chemically enhanced backwash operation was completed, the hollow fiber nanofiltration membrane system enters the next operation process with 3.87 bar of the feedwater pressure and 3.81 bar of the pressure difference. Filtration performance of the hollow fiber nanofiltration membrane system recovers well. After that, the hollow fiber nanofiltration membrane system continues to operate for a month with 3.85-4.49 bar of the feedwater pressure. At the same period, other relatively simple and fixed operation control methods were adopted, which has 3.85-5.13 bar of the feedwater pressure, showing that by adopting the control method of the present disclosure, a decline of the feedwater pressure of the hollow fiber nanofiltration membrane system can reach 0.64 bar, and the power consumption can be saved about 12.3%.

It should be noted that, the terms "first" and "second" are only used to distinguish to distinguish an entity or operation from another entity or operation, and do not require or imply the existence of any actual relationship or order between these entities or operations. In addition, the terms "include", "comprise" or any other variation thereof are intended for non-exclusive, so that a process, method, material or device comprising a set of elements includes not only those elements, but also includes other elements not expressly listed, or includes inherent elements of the process, method, material or device. Without further limitation, an element is defined by a sentence "includes a . . . " does not preclude the existence of another identical element in the process, method, material or device in which the element is included.

Described above are only specific embodiments of the present disclosure for those skilled in the art to understand or realize the present disclosure. Various modifications of those embodiments will be apparent to those skilled in the art. The general principles defined herein may be implemented in other embodiments without departing from the spirit of this application. Therefore, the present disclosure will not be limited to the embodiments herein, but will be subject to the broadest scope in consistence with the principles and novel features disclosed herein.

What is claimed is:

1. A control method of a hollow fiber nanofiltration membrane system, the hollow fiber nanofiltration membrane system comprising a water feeding system, a return system, a hollow fiber nanofiltration membrane group, a water production system, a cleaning system, a dosing system and a program control system; the water feeding system being connected with the hollow fiber nanofiltration membrane group through a first pipe, and being configured to provide a feedwater pressure required by operation of the hollow fiber nanofiltration membrane group;

the return system being connected with the first pipe, and being configured to provide a concentrated water return flow required by the operation of the hollow fiber nanofiltration membrane group;

the hollow fiber nanofiltration membrane group being configured to perform solid-liquid separation for a raw water sample to trap foulants and produce clear water;

the water production system being connected with the hollow fiber nanofiltration membrane group, and being configured to provide a water storage tank or a water box to store produced water from the hollow fiber nanofiltration membrane group and provide a discharge destination for the produced water from the hollow fiber nanofiltration membrane group;

the cleaning system being connected with the water production system and the hollow fiber nanofiltration membrane group, and being configured to provide physical cleaning and chemical cleaning for the hollow fiber nanofiltration membrane group;

the dosing system comprising a first dosing device and a second dosing device; the first dosing device being connected with the first pipe, and being configured to provide selective and simultaneous dosing of a scale inhibitor at an inlet end of the hollow fiber nanofiltration membrane group; the second dosing device being connected with the cleaning system, and being configured to feed an acid, an alkali or a disinfectant to the cleaning system;

the program control system being connected with the water feeding system, the return system, the water production system, the cleaning system and the dosing system, and being configured to control operation of the water feeding system, the return system, the water production system, the cleaning system and the dosing system; and the program control system being also configured for simultaneous monitoring, observation and feedback record of operation data or state and fault or alarm, and real-time analysis and calculation to adjust a working condition parameter; and the control method comprising:

presetting, by the program control system, an operation mode according to a preset working condition and an inlet water quality obtained in real time, and automatically selecting, by the program control system, whether to add the scale inhibitor or perform concentrated water return at a beginning of filtration;

automatically outputting, by the program control system, a dosage of the scale inhibitor or the concentrated water return flow to perform dosing of the scale inhibitor or the concentrated water return in response to a requirement to add the scale inhibitor or perform the concentrated water return;

monitoring, by the program control system, a change of the inlet water quality, and the feedwater pressure or a transmembrane pressure in real time during the operation of the hollow fiber nanofiltration membrane group; and adjusting, by the program control system, the dosing of the scale inhibitor or the concentrated water return flow according to a calculation result in response to a case that the feedwater pressure or the transmembrane pressure exceeds a set limit value; wherein the preset working condition comprises a membrane flux and a recovery rate; and the inlet water quality comprises water temperature, electrical conductivity and turbidity;

the membrane flux is represented as J; the recovery rate is represented as y; the water temperature is represented as t; the electrical conductivity is represented as E; and the turbidity is represented as $T_U$;

wherein $a=0.5E/(1-y)/1000$;

$b=(T_U/3)\times(J/25)\times(y/80\%)$; and $c=t/15$;

when a<1 and b<1, neither the dosing of the scale inhibitor nor the concentrated water return is performed;

when a≥1 and b<1, only the scale inhibitor is added, and the concentrated water return is not performed; and at this time, the dosage of the scale inhibitor is represented as D, when c≥1, D=0.3a−0.1; and when 0<c<1, D=0.3a;

when a<1 and b≥1, the scale inhibitor is not added, and only the concentrated water return is performed; and at this time, a ratio of the concentrated water return is represented as F, when c≥1, F=2.1b−0.5; and when 0<c<1, F=2.1b;

the number of filtration-flushing operations in a single chemically enhanced backwash (CEB) cycle is set as M, a limit of the feedwater pressure and a limit of the transmembrane pressure at an end of an M-th filtration before an M-th flushing are set to 6 bar and 5.5 bar, respectively, and the feedwater pressure and the transmembrane pressure at a beginning of a first filtration are respectively represented as $P1_{1beginning}$ and $P2_{1beginning}$, such that a limit of the feedwater pressure and a limit of the transmembrane pressure at an end of an N-th filtration before an N-th flushing are $P1_{Nend}=P1_{1beginning}+(6-P1_{1beginning})\times N/M$, and $P2_{Nend}=P2_{1beginning}+(6-P2_{1beginning})\times N/M$, wherein $1\leq N\leq M$; and during the N-th filtration, an actual feedwater pressure and an actual transmembrane pressure of the hollow fiber nanofiltration membrane group are respectively represented as $P1_N$ and $P2_N$, and the feedwater pressure and the transmembrane pressure at a beginning of the N-th filtration are respectively expressed as $P1_{Nbeginning}$, and $P2_{Nbeginning}$, such that an increase of the feedwater pressure is expressed as $\Delta P1=P1_N-P1_{Nbeginning}$, and an increase of the transmembrane pressure is expressed as $\Delta P2=P2_N-P2_{Nbeginning}$; and if $P1_N>P1_{Nend}$ or $P2_N>P2_{Nend}$, the dosing of the scale inhibitor or the concentrated water return is adjusted as follows:

when only $P1_N>P1_{Nend}$ occurs, the ratio of the concentrated water return is increased by 0.5;

when only $P2_N>P2_{Nend}$ occurs, the dosage of the scale inhibitor is increased by 0.2 ppm; and when $P1_N>P1_{Nend}$ and $P2_N>P2_{Nend}$ both occur, if $\Delta P1 \geq \Delta P2$, the ratio of the concentrated water return is increased by 0.5; and if $\Delta P1<\Delta P2$, the dosage of the scale inhibitor is increased by 0.2 ppm.

2. The control method of claim 1, further comprising:
determining, by the program control system, a flushing mode at an end of each filtration process according to an operation pressure change or a transmembrane pressure change during the filtration process, wherein the flushing mode is forward flushing+air flushing, backwashing, or dosing-forward flushing+air flushing.

3. The control method of claim 2, wherein during the N-th filtration, an increase rate of the feedwater pressure is expressed as $\Delta 1=\Delta P1/P1_{Nbeginning}$, and an increase rate of the transmembrane pressure is expressed as $\Delta 2=\Delta P2/P2_{Nbeginning}$;

when the N-th filtration is ended, and an N-th flushing is about to be performed, if $\Delta P1\geq\Delta P2$, a mode of forward flushing+air flushing is executed; if $\Delta P1<\Delta P2$ and $\Delta 1\geq\Delta 2$, a mode of backwashing is executed; and if $\Delta P1<\Delta P2$ and $\Delta 1<\Delta 2$, a mode of dosing-forward flushing+air flushing is executed.

4. The control method of claim 1, further comprising:
when a chemically enhanced backwash operation is required after multiple filtration-flushing operations have been carried out, calculating, by the program control system, a dosing concentration and soaking time of the chemically enhanced backwash operation based on a feedwater pressure change and a transmembrane pressure change in an operation cycle before the chemically enhanced backwash operation.

5. The control method of claim 4, wherein the feedwater pressure change and the transmembrane pressure change in the operation cycle before the chemically enhanced backwash operation are respectively expressed as $\Delta P3=P1_M-P1_{1beginning}$, and $\Delta P4=P2_M-P2_{1beginning}$, when $\Delta P3\leq 0.5$ bar and $\Delta P3/\Delta P4\geq 1$, the dosing concentration of the chemically enhanced backwash operation is 2000 ppm of citric acid, 50 ppm of sodium hypochlorite and 100 ppm of sodium hydroxide, and the soaking time of the chemically enhanced backwash operation is 10 min;

when $\Delta P3\leq 0.5$ bar and $\Delta P3/\Delta P4<1$, the dosing concentration of the chemically enhanced backwash operation is 2500 ppm of citric acid, 50 ppm of sodium hypochlorite and 100 ppm of sodium hydroxide, and the soaking time of the chemically enhanced backwash operation is 10 min;

when 0.5 bar$<\Delta P3\leq 1.0$ bar and $\Delta P3/\Delta P4>1$, the dosing concentration of the chemically enhanced backwash operation is 2500 ppm of citric acid, 100 ppm of sodium hypochlorite and 150 ppm of sodium hydroxide, and the soaking time of the chemically enhanced backwash operation is 15 min;

when 0.5 bar$<\Delta P3\leq 1.0$ bar and $\Delta P3/\Delta P4\leq 1$, the dosing concentration of the chemically enhanced backwash operation is 3000 ppm of citric acid, 100 ppm of sodium hypochlorite and 150 ppm of sodium hydroxide, and the soaking time of the chemically enhanced backwash operation is 15 min;

when $\Delta P3>1.0$ bar and $\Delta P3/\Delta P4>1$, the dosing concentration of the chemically enhanced backwash operation is 3500 ppm of citric acid, 200 ppm of sodium hypochlorite and 250 ppm of sodium hydroxide, and the soaking time of the chemically enhanced backwash operation is 20 min; and when $\Delta P3>1.0$ bar and $\Delta P3/\Delta P4<1$, the dosing concentration of the chemically enhanced backwash operation is 4000 ppm of citric acid, 200 ppm of sodium hypochlorite and 250 ppm of sodium hydroxide, and the soaking time of the chemically enhanced backwash operation is 20 min.

* * * * *